(12) United States Patent
Edwards et al.

(10) Patent No.: US 6,198,734 B1
(45) Date of Patent: Mar. 6, 2001

(54) ADAPTIVE RADIO COMMUNICATIONS SYSTEM

(75) Inventors: Keith Russell Edwards, Paignton; Alister Graham Burr, York; Timothy Conrad Tozer, Elvington; David Andrew James Pearce, York, all of (GB)

(73) Assignee: Northern Telecom Incorporated, Montreal (CA)

( * ) Notice: Subject to any disclaimer, the term of this patent is extended or adjusted under 35 U.S.C. 154(b) by 0 days.

(21) Appl. No.: 08/789,974

(22) Filed: Jan. 29, 1997

(30) Foreign Application Priority Data

Oct. 12, 1996 (GB) .................................................. 9621328

(51) Int. Cl.[7] ........................................................ H04J 3/16
(52) U.S. Cl. ................................................................ 370/347
(58) Field of Search ................................. 370/338, 347, 370/428, 349, 346, 389, 249, 465, 241, 245, 247, 254, 255, 292, 307, 341, 343, 348, 337, 442, 480, 395, 471; 455/412, 38.3, 433, 67.1, 67.5, 63; 375/200, 356, 357

(56) References Cited

U.S. PATENT DOCUMENTS

| 5,351,134 | * | 9/1994 | Yaguchi et al. ...................... 358/435 |
| 5,450,616 | | 9/1995 | Rom ...................................... 455/54.1 |
| 5,574,979 | * | 11/1996 | West ...................................... 375/356 |
| 5,734,645 | * | 3/1998 | Raith et al. ........................... 370/329 |

FOREIGN PATENT DOCUMENTS

| WO 93/00751 | 1/1993 | (WO) . |
| WO 95/07578 | 3/1995 | (WO) . |
| WO 95/28814 | 10/1995 | (WO) . |

* cited by examiner

*Primary Examiner*—Dang Ton
(74) *Attorney, Agent, or Firm*—John D. Crane

(57) ABSTRACT

This invention relates to radio communication networks and more particularly, but not exclusively, to radio communication networks using multiple access techniques. A system and method for adaptively changing the characteristics of a signal transmitted across the network is provided. In one embodiment, the communications network includes at least two transceivers; wherein at least one of the transceivers is capable of sending a feedback signal to the other transceiver after receiving a signal transmitted over the network from the other transceiver after analysis of the transmitted signal and in the event that the signal characteristics of the system need to be varied.

15 Claims, 3 Drawing Sheets

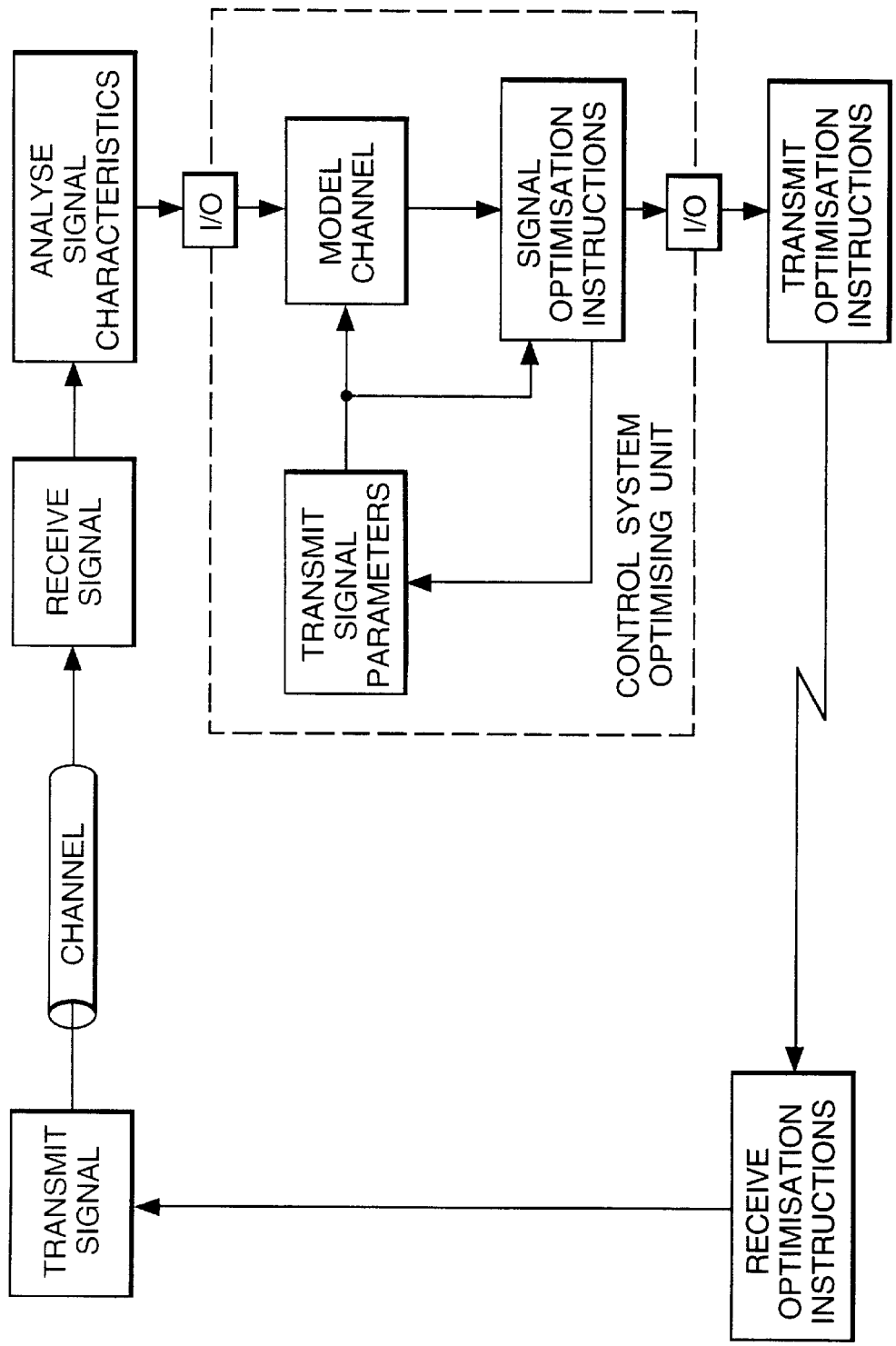

ADAPTIVE RADIO COMMUNICATIONS SYSTEM

FIELD OF THE INVENTION

This invention relates to radio communications and in particular relates to a method for assigning radio frequency bearers in a radio communications system which is subject to slow temporal fading.

BACKGROUND TO THE INVENTION

In radio communications systems such as GSM digital mobile radio protocol, the communications channel hops from one frequency band to another according to a specified routine. The system overcomes the effects of fading, scattering and other transmission problems on a particular channel by swapping channels and providing an average of the signal strength of the channels available, which will provide a sufficient signal. Obstacles in a signal path, such as buildings in built-up areas and hills in rural areas, act as signal scatterers and can cause signalling problems. These scattered signals interact and their resultant signal at a receiving antenna is subject to deep and rapid fading and the signal envelope often follows a Rayleigh distribution over short distances, especially in heavily cluttered regions.

A receiver moving through this spatially varying field experiences a fading rate which is proportional to its speed and the frequency of the transmission. Since the various components arrive from different directions, there is also a Doppler spread in the received spectrum. If the channel allocation was static, then as the subscriber, for example, moved to an urban environment where signal reflections affected the particular frequency in which the channel was operating more than other frequencies, then the channel which was previously best then becomes poor. In fact such movement may produce a break in communications. In fixed radio applications, the problems of fading still exist but are not so rapid; in a fixed system, the best channel would be likely to stay the best signal for a period of time. Some mobile radio protocols are similarly inflexible; in the case of DECT, dynamic channel assignment only applies when a call is set up.

In fixed radio applications, the problems of fading still exist but are not so rapid; in a fixed system, the best channel would be likely to stay the best signal for a period of time. Frequently, the fading follows a Rayleigh distribution.

In radio communications, signals are transmitted at a particular frequency, in a frequency band or in several frequency bands. The signals may be modulated in a variety of fashions using techniques such as Time Division Multiple Access (TDMA), Frequency Division Multiple Access (FDMA), and a multitude of other techniques. Nevertheless there are a finite number of available individual communications channels for separate sets of parties to communicate with each other.

A radio communications system of the TDMA-TDD type is designed so that a multiple frame is made up of a plurality of frames each divided into a plurality of time slots; each base station selects an idle time slot of a multiple frame for transmission of the control-channel signal to send control-channel information to the associated receiver at intervals of a multiple frame period. FIG. 1 is a timing chart showing the relationship of the transmission and reception of signals between an base station (BS) and an outstation (OS).

In FIG. 1, a block of up-link signal time slots and a block of down-link signal time slots have four slots respectively. The time slots of each frame are divided into a block of down-link signal (for communication from the base station to the out station) slots 10 (down-link signal slot block 10) and a block of up-link signal (for communication from the out station to the base station) slots 20 (up-link signal slot block 20), and the aforementioned slot for transmission of the control-channel signal directed to the out station (which slot will be referred to as the down-link control-channel slot, hereinafter) is selected from the down-link signal slots of the block of a frame (for example, a time slot 4 in FIG. 1 is selected).

The transmission of the control-channel signal from the mobile station to the base station is carried out at one (which will be referred to as the up-link signal slots of each frame having a corresponding positional relationship with the above down-link control-channel slot. e.g., located as shifted by a half frame from the down-link control-channel slot. For example, when the time slot 4 in FIG. 1 is used as the down-link control-channel signal slot, a time slot 8 shifted by a half frame from the time slot 4 is used as the up-link control-channel slot. The remaining slots (time slots 1, 2, 3, 5, 6 and 7 in FIG. 1) of the up and down-link signal slot blocks of each frame other than the up and down-link control-channel signal slots are used as slots for communication of data information between the base station and out station.

Each base station transmits the control-channel signal at intervals of the multiple frame period with use of a signal carrier of an identical frequency commonly used by the other base stations and also with use of the down-link control-channel slot of the specific frame selected by its own base station. With respect to the frames of each multiple frame other than the specific frame, ones of the down-link signal slots located to correspond to the down-link signal slots located to correspond to the down-link control-channel slot, e.g. located as shifted by one frame are not effectively used. Each base station assigns specific up-and down-link traffic-channel slots of each frame to each of the out stations under the jurisdiction of the base station and assigns a frequency to one selected from a plurality of predetermined channels. Accordingly, each out station communicates with the base station and another out station via the base station at intervals of each of the frames of the multiple frame with use of the traffic channel slots specified by the base station.

A disadvantage of employing such schemes, however, is that the numbers of time slots for actual transmission of data are reduced by the presence of these control-channel slots which represent large overheads, and inevitably reduce system capacity. These control-channel slot overheads detract from the gains in efficiency achieved by the use of adaptive techniques. Where training sequences are employed over an asymmetrical channel only an approximation of the forward channel characteristics can be determined, further reducing the optimisation that can be achieved.

Where training sequences have not been employed, systems have tended to rely on each transmitter analysing the characteristics of received signals transmitted from the other end of the circuit. However during data transmission, the majority of information tends to flow in one direction, e.g. during transmission of a large data file. Where transmission time is long, the channel conditions may change sufficiently that the characteristics of the transmitted signal are no longer optimal. However, as the majority of information flows in one direction only, the transmitter does not receive information relating to required changes in signal characteristics.

A slow adaptive modulation System (AMS) has been proposed for future multi-media communication systems.

This slow adaptive modulation system assigns modulation parameters, as well as the number of slots, in each TDMA frame according to the average channel conditions, such as the average carrier-to-noise plus interference power ratio (C/(N+I)), and the average delay spread.

In this system, when the average (C/(N+1) during a call is high, and the average delay spread is small, a higher modulation level and/or higher symbol rate, and a smaller number of slots are assigned to increase system capacity without degrading the transmission quality. Conversely, when the average C/(N+I) is low, or average delay spread is large, a lower modulation level and/or lower symbol rate, and a larger number of slots, are assigned to improve transmission quality. As a result, the slow AMS can increase system capacity by mitigating the effect of spatially distributed electric field strength variation. Various dynamic channel assignment (DCA) algorithms have been proposed to effectively assign channels in microcellular systems. In DCA, the whole of the channel is shared by all the base stations (BSs), and any channel with an average C/(N+I) larger than a threshold value is available for each terminal. As a result, DCA can increase system capacity by mitigating spatially and temporally distributed traffic. Adaptive modulation dynamic channel assignment schemes (AMDCA) take up valuable overhead space and, at present, are unlikely to be widely implemented as such.

OBJECT OF THE INVENTION

It is an object of the present invention to provide a system and method which overcomes the above disadvantages and seeks to provide an improved form of channel re-allocation in a radio communications system.

SUMMARY OF THE INVENTION

According to a first aspect of the present invention, there is provided a communications network including at least two stations for transmitting and receiving; wherein at least one of the stations is capable of sending a control signal to the other station after receiving a signal transmitted over said network from said other station after analysis of the transmitted signal, which control signal acts as a feedback signal and is transmitted as a data packet independent of the other data and overhead signals; and, in the event that the signal characteristics of the system need to be varied, the signalling characteristics are varied in a sequential fashion.

The data packet is transmitted independently of the rate and type of the other data and overhead signals, although could take, for example a data slot normally reserved for a TDMA transmission. The control signal could also be transmitted as an overhead on an infrequent basis. In this fashion, the control signal is transmitted by way of a data packet whereby no specific system overheads are required, thereby providing increased system capacity.

By providing a system wherein the signalling characteristics are varied in a known, sequential fashion, the data relating to changes of frequency and other parameters, need not be retained within the control portions of data signals. This reduces the overheads of the signalling protocol, thereby providing increased system capacity.

In accordance with another aspect of the present invention, there is provided a multi-bearer communications network comprising carrier allocation means, feedback means for a multi-bearer communications network response to channel variation; wherein responsive to a degradation in signal quality identified by a feedback mechanism, the signal characteristics of the link are varied in a sequential fashion.

Preferably, the signalling techniques that are varied can be selected from a range of frequency changing schemes, adaptive modulation techniques and coding techniques. Preferably, the feedback signal is provided as a data packet, which can be a slot in a multiple access system. The feedback signal can be transmitted as a random access slot. The feedback signal can advise the transmitter to reduce or increase signal power, change modulation scheme, frequency or other types of signal parameters. The communications system can be a radio communications system, but can find applicability in other communications systems employing other signalling media.

According to a still further aspect of the present invention, there is provided a method of communicating over a communications network including at least two stations; said method comprising the steps of:

1) transmitting a signal from a first station of the communications network to a second station of the communications network;

2) receiving at the second station a signal transmitted over said circuit by a transmitting end;

3) analysing the transmission characteristics of said transmitted signal;

4) determining whether the signal characteristics need to be varied and;

5) in the case that the signal characteristics need to be varied transmitting a control signal as a feedback signal independent of other data and overhead signals to the first station in response to said analysis of said received signal characteristics whereby the transmitter is instructed to change the signalling characteristics in a sequential fashion.

Preferably, the feedback signal is provided as a data packet, which can be, for example, a slot in a multiple access system. The feedback signal can be transmitted as a random access slot. The feedback signal can advise the transmitter to reduce or increase signal power, change modulation scheme, frequency or other types of signal parameters. The communications system can be a radio communications system, but can find applicability in other communications systems employing other signalling media.

In accordance with another aspect of the invention, there is provided a method of communicating over a multi-bearer communications network wherein, responsive to a degradation in signal quality identified by a feedback mechanism, the signal characteristics of the link are varied in a sequential fashion.

The signal characteristic that is varied can be a modulation type such as quadrature phase shift keying or quadrature amplitude modulation. The signal characteristic that is varied could relate to the slot size or repetition rate. The frequency or frequency band of operation is a further signal characteristic that can be varied.

The invention is particularly suited to situations where slow temporal fading is present as the main form of fading such as a fixed radio access telecommunications environment: the fading should not be faster than the adaptation time constant associated with the system, which inter alia is dependent upon the processing rate of the system and the data rate.

BRIEF DESCRIPTION OF THE DRAWINGS

The invention will now be described with reference to the accompanying drawings, wherein:

FIG. 3 is a block diagram of a radio frequency access system embodiment.

DESCRIPTION OF THE PREFERRED EMBODIMENT

Figure 1:
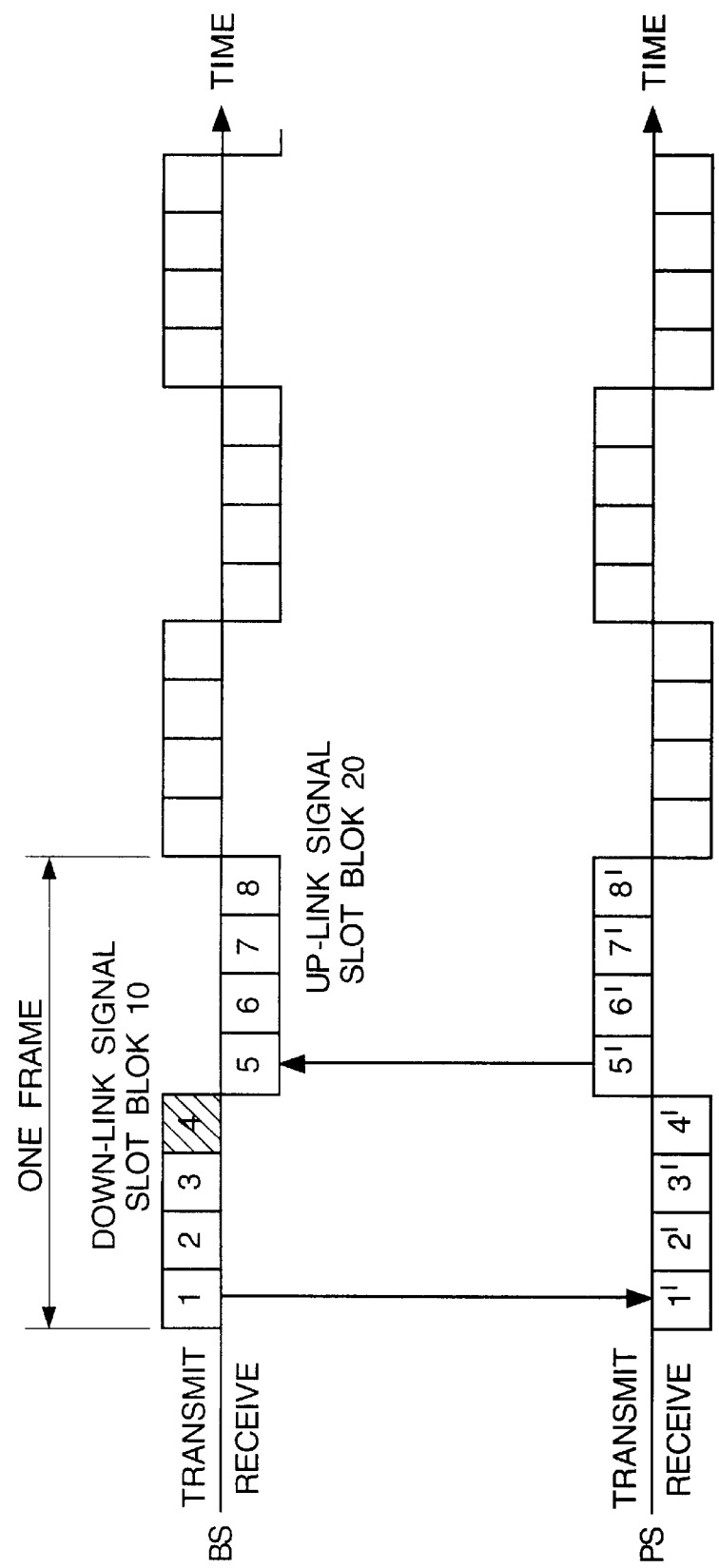
FIG. 1 details a TDMA sequence.
Figure 2:
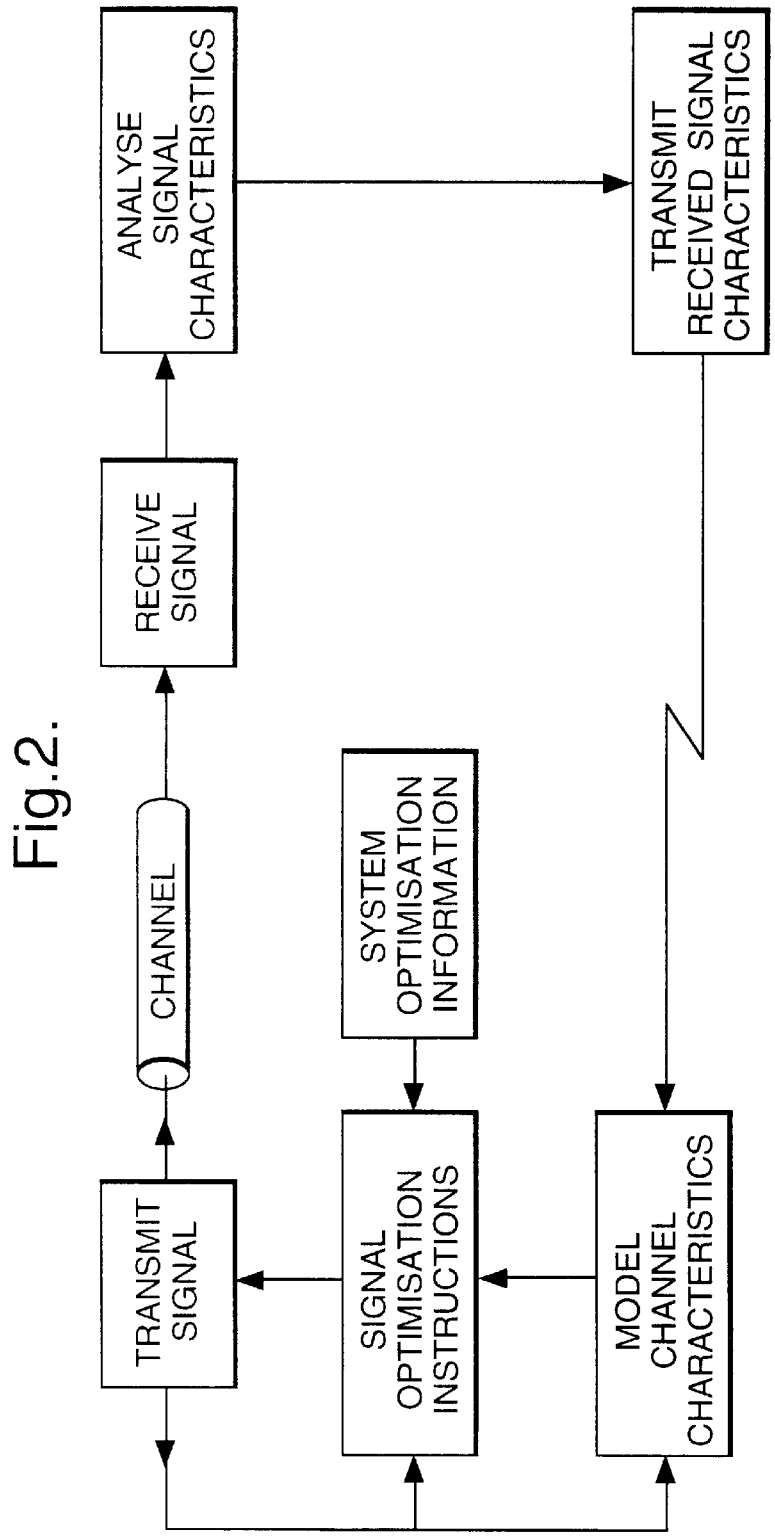
FIG. 2 is a block diagram of a first embodiment.

Referring now to FIG. 2, there is shown a block diagram of one particular system mode in accordance with the present invention. In the system described, a voice/data signal (herein after referred to as the signal) is transmitted across a channel where it is received by a receiving end of the circuit.

At the receiving end the transmitted signal, the signal is analysed to determine the transmission characteristics of the signal. Parameters such as attenuation, noise interference levels etc. are assessed. At the receiving end the transmitted signal, the signal is analysed to determine the transmission characteristics of the signal. If it is determined that the signal quality is varying outside an acceptable boundary or beyond an acceptable threshold, then a feedback signal is transmitted back to the transmitter.

This control signal is transmitted as a data packet independent of the other data and overhead signals, although could take, for example a data slot normally reserved for a TDMA transmission. The control signal could also be transmitted as an overhead on an infrequent basis. The parameters are communicated via the transmit path of the receiving end of the circuit. The transmitter then adapts its scheme of transmission on a sequential basis. In this fashion, the control signal is transmitted by way of a data packet whereby no specific system overheads are required, thereby providing increased system capacity.

The advantages provided by this system are that the capacity of the system can be improved by the reduction of overheads in the signalling protocols. The system can improve capacity on a cell-by-cell basis. The system is particularly appropriate to communications networks which operate under conditions of slow fades and the like, as is common in fixed radio communications systems. The system also provides flexibility in the number of communications that may be conducted within a cell.

The signal characteristic that is varied can be a modulation type such as quadrature phase shift keying or quadrature amplitude modulation. The signal characteristic that is varied could relate to the slot size or repetition rate. The frequency or frequency band of operation is a further signal characteristic that can be varied.

The invention is particularly suited to situations where slow temporal fading is present as the main form of fading such as a fixed radio access telecommunications environment: the fading should not be faster than the adaptation time constant associated with the system, which inter alia is dependent upon the processing rate of the system and the data rate.

The transmitting end of the circuit will receive these parameters and then adapt the characteristics of the transmit path. To analyse the signals, standard signal analysis techniques can be used to derive signal characteristics.

The feedback signal can be transmitted by way of a data packet whereby no specific system overheads, such as training sequences and the like are required. This contrasts with the techniques used, for example, in GSM, where a dedicated portion of each data packet is allocated to signal administration functions. This simplifies the signalling and increases the system capacity. In another embodiment, the feedback packets could be transmitted on a contention basis with a reduced overhead scheme.

The use of network/system information and/or commands can be used to assist with determining whether trade offs between signal parameters can achieve acceptable network/system performance.

FIG. 3 is a block diagram of a network employing multiple access techniques typically a radio frequency multiple access system. The diagram assumes that the out station which could be a mobile unit (MU) or a residential subscriber unit (RSS) is transmitting to a base station. Signal analysis, however, could be carried out in a residential subscriber unit or mobile unit but this could increase outstation unit cases. The out station could also provide the base station with transmit signal optimisation instructions.

Signal characteristics can be agreed upon by both parties during call set up or may be a system default process. These parameters are stored in a transmitted signal parameters memory detailed in FIG. 3. Where default signal characteristics are used, these characteristics are similarly stored. During a signal optimisation procedure, the system may have reference to these signal characteristics when generating optimising instructions. It is preferred that this store be updated with optimised characteristics when optimisation instructions are issued to the transmitter. By retaining and updating a central store of transmitted signal characteristics, the system reduces the need to perform channel modelling and signal optimisation routines.

Allocation of circuit instructions to particular frames could follow a number of methods according to the systems priorities with regard to optimisation. For example, a system may be aiming to achieve maximum data throughput during a period of heavy data use. It may be desirable to modify the encoding algorithms used to achieve this. In this case, the system may allocate slots on successive frames in order of heaviest user to lightest user. Alternatively, high system quality may be preferred. In such an instance, slots on successive frames may be allocated to those circuits with highest quality transmission before improvements in poor quality signals may be effected. Other types of allocation techniques could be used. For example, a circuit may request to transmit optimisation information only when it is determined that the transmitted signal falls outside optimum signal parameters. In such an instance, the optimisation information may be allocated to contention slot transmission.

What is claimed is:

1. A communications network including at least two transceivers, wherein at least one of the transceivers is capable of sending a feedback signal to the other transceiver after receiving and analysing a signal transmitted over said network from said other transceiver and, in the event that a signal mode of the network needs to be varied, the signal mode is varied in a sequential fashion wherein the signal mode is selected from a range including frequency changing schemes, adapted modulation techniques and coding techniques, wherein the feedback signal is transmitted as a data packet independent of other data and overhead signals.

2. A communications network including at least two stations for transmitting and receiving; wherein at lest one of the stations is capable of sending a control signal to the other station after receiving a signal transmitted over said network from said other station after analysis of the transmitted signal, which control signal acts as a feedback signal and is transmitted as a data packet independent of other data and overhead signals; and, in the event that signal characteristics of the system need to be varied, the signal characteristics are varied in a sequential fashion wherein the signal characteristics are selected from a range including frequency changing schemes, adaptive modulation techniques and coding techniques.

3. A communications network including at least two transceivers, wherein at least one of the transceivers is capable of sending a feedback signal to the other transceiver after receiving and analysing a signal transmitted over said network from said other transceiver and, in the event that a signal mode of the network needs to be varied, the signal mode is varied in a sequential fashion, wherein the feedback signal is transmitted as a data packet independent of the other data overhead signals and wherein the feedback data packet is a slot in multiple access system.

4. A communications network according to claim 1 wherein the network is a radio communications system.

5. A method of communicating over a communications network including at least two transceivers, said method comprising the steps of:

1) transmitting a signal from a first transceiver of the communications network to a second transceiver of the communications network;

2) receiving at the second transceiver the signal transmitted by said first transceiver;

3) analysing said transmitted signal to determine a transmission mode of said transmitted signal;

4) determining whether the signal mode needs to be varied and;

5) in the case that the signal mode needs to be varied transmitting a feedback signal to the first transceiver, whereby the transmitter is instructed to change the signalling mode in a sequential fashion, wherein the signal mode is selected from a range including frequency changing schemes, adapted modulation techniques and coding techniques.

6. A method of communicating over a communications network including at least two stations, said method comprising the steps of:

1) transmitting a signal from a first station of the communications network to a second station of the communications network;

2) receiving at the second station a signal transmitted over said network by said first station;

3) analysing said transmitted signal to determine a transmission mode of said transmitted signal;

4) determining whether the signal mode needs to be varied and;

5) in the case that the signal mode needs to be varied, transmitting a control signal as a feedback signal independent of other data and overhead signals to the first station, whereby the transmitter is instructed to change the signal mode in a sequential fashion, wherein the signal mode is selected from a range including frequency changing schemes, adapted modulation techniques and coding techniques.

7. A method according to claim 5 wherein the signal mode that is varied is the modulation type.

8. A method according to claim 5 wherein the signal mode that is varied is the frequency band of operation.

9. A method of according to claim 5 wherein, the signals are transmitted in a time slot and the mode that is varied is the slot position.

10. A method of according to claim 5 wherein, the signals are transmitted in time slots and the mode that is varied is the slot size.

11. A method of according to claim 6 wherein, the signal mode that is varied is modulation type.

12. A method of according to claim 6 wherein, the signal mode that is varied is the modulation rate.

13. A method of according to claim 6 wherein, the signal mode that is varied is frequency or frequency band of operation.

14. A method of according to claim 6 wherein, the signals are transmitted in a time slot and the mode that is varied is slot position.

15. A method of according to claim 6 wherein, the signals are transmitted in time slots and the mode that is varied is slot size.

* * * * *